United States Patent [19] [11] 4,304,902
Landoll [45] Dec. 8, 1981

[54] COPOLYMERS OF ETHYLENE OXIDE WITH LONG CHAIN EPOXIDES

[75] Inventor: Leo M. Landoll, Wilmington, Del.

[73] Assignee: Hercules Incorporated, Wilmington, Del.

[21] Appl. No.: 218,158

[22] Filed: Dec. 19, 1980

Related U.S. Application Data

[63] Continuation-in-part of Ser. No. 101,293, Dec. 7, 1979, abandoned.

[51] Int. Cl.$^3$ ............................................. C08G 65/08
[52] U.S. Cl. ................................... 528/419; 568/624; 568/625; 260/29.2 EP
[58] Field of Search ................ 528/419; 568/624, 625

[56] References Cited

U.S. PATENT DOCUMENTS

| | | | |
|---|---|---|---|
| 2,987,489 | 6/1961 | Bailey et al. | 260/2 |
| 3,256,211 | 6/1966 | Bailey et al. | 260/2 |
| 3,629,160 | 12/1971 | Tushaus | 260/2 |
| 4,129,717 | 12/1978 | Praetorius et al. | 528/421 |
| 4,159,975 | 7/1979 | Praetorius et al. | 525/91 |

*Primary Examiner*—Earl A. Nielsen
*Attorney, Agent, or Firm*—William S. Alexander

[57] ABSTRACT

Disclosed are copolymers of ethylene oxide and epoxy-n-alkane of 12 to 25 carbon atoms. These copolymers exhibit greater viscosity in water or in aqueous acid solutions than do ethylene oxide homopolymers of comparable molecular weight and this greater viscosity is more stable to mechanical shear.

2 Claims, No Drawings

COPOLYMERS OF ETHYLENE OXIDE WITH LONG CHAIN EPOXIDES

This application is a continuation-in-part of copending U.S. Application Ser. No. 101,293, filed Dec. 7, 1979.

This invention relates to crystalline polymers of ethylene oxide with a minor amount of a second alkylene epoxide.

Poly(ethylene oxide) homopolymer is a known material of commerce. It is readily soluble in water and aqueous acid media. Aqueous solutions of poly(ethylene oxide) have very poor viscosity stability to mechanical shear, however. In fact, the viscosities of severely sheared solutions are not sufficiently greater than that of water to give the polymer much value as a thickener. It is useful primarily as a water-soluble film former and friction reducing agent.

Copolymers of epoxide monomers are also well known. Materials such as water-soluble poly(ethylene oxide)-co(propylene oxide) and poly(ethylene oxide-epichlorohydrin are important items of commerce useful as detergents and surfactants. In addition, the possibility of copolymerizing two or more epoxides of relatively long chain length is suggested in such U.S. Pat. Nos. 3,312,637; 3,441,521; and 3,484,388. The copolymers contemplated by the cited prior art patents are generally rubbery, water-insoluble materials capable of being molded, extruded and otherwise formed.

The present invention contemplates modified poly(ethylene oxide) which retains solubility in water or aqueous acid but which forms solutions exhibiting substantially higher viscosity and viscosity stability than do solutions of unmodified poly(ethylene oxide) of comparable molecular weight. Specifically, the modified products of this invention are copolymers containing 96 to 99.9% by weight of ethylene oxide and 4 to 0.1 % by weight of at least one 1,2-epoxy-n-alkane containing 12 to 25 carbon atoms. The preferred copolymers are those containing about 2 to about 0.4% by weight of a 1,2-epoxy-n-alkane having 18 to 24 carbon atoms. Likewise, the preferred copolymers have a molecular weight of about 200,000 to 800,000, although molecular weight can range from about 25,000 to about 4,000,000.

Copolymers of ethylene oxide and a long chain epoxy alkane according to the invention are highly crystalline materials having heats of fusion ranging from about 23 to 35 calories per gram and melting temperatures between about 55° and 65° C. Both of the above parameters are similar to poly(ethylene oxide) homopolymer. It is in their behavior in solution that they differ significantly from poly(ethylene oxide) homopolymer.

All of the copolymers of the invention are soluble in 15% HCl solution. Depending upon the level and carbon number of the epoxy alkane comonomer and the molecular weight of the copolymer, most are also soluble in water.

Aqueous solutions of the copolymers of this invention exhibit substantially higher viscosity than do solutions of poly(ethylene oxide) homopolymer of the same concentration. It is possible, using these copolymers, to increase the viscosity by 100 and 200 fold compared to solutions of poly(ethylene oxide) homopolymer of similar molecular weight. The same effect is noted in strong acid solutions.

Another property improvement noted for the copolymers of this invention, as compared to poly(ethylene oxide) homopolymer, is their resistance to shear degradation in solution. Poly(ethylene oxide) homopolymers typically exhibit very low shear resistance, losing 90 to 95% of their solution viscosity when subjected to high shear conditions at room temperature for five minutes. The copolymers of this invention typically lose no more than about 30% of their viscosity under similar conditions either in plain water or in acid solution.

The copolymers of the invention are defined herein in terms of their solubility in 15% hydrochloric acid. They are also soluble in other mineral acid solutions, such as, e.g., sulfuric, phosphoric and nitric acid to form high viscosity solutions. Moreover, similarly to their aqueous solutions, such acid solutions are relatively stable both to shear and to temperature. For example, in 15% hydrochloric acid a copolymer of this invention can retain 65% of its viscosity after four hours at 65° C., which is better than unmodified polyethylene oxide which provides the same initial viscosity in the 15% hydrochloric acid solution.

Further differentiating the solution behaviour of the copolymers of this invention from that of conventional poly(ethylene oxide) homopolymers is their behavior in the presence of surfactants. Unlike conventional poly(ethylene oxide), the copolymers of this invention interact with ethoxylated nonionic surfactants to form ultra high viscosity solutions and even elastic, self healing gels in many cases. Gel properties appear to be related to the amount of comonomer present in the copolymer. For a given comonomer the maximum gel strength increases as the amount of comonomer in the polymer approaches the water solubility limit. For a $C_{20}-C_{24}$ comonomer the maximum is in the range of 1.3-1.7%. For a $C_{12}$ comonomer the maximum is in the range of 2.5%.

Surfactant in small quantities will also solubilize the copolymers of this invention which, due, e.g., to irregularities in their preparation, to the presence of an excess of long chain modifier, or to an overly high molecular weight, are not totally soluble in plain water. Only very small amounts of an ethoxylated nonionic surfactant are required to effect this solubilization. For example, as little as 0.05 volume % in a 1% solution of an incompletely soluble copolymer can transform a hazy or structured solution into a sparkling clear, highly viscous solution. Continued addition of ethoxylated surfactant increases the viscosity to a maximum, after which the viscosity decreases rapidly as the copolymer becomes insoluble in the excess surfactant.

The surfactant solubility and viscosity increasing phenomena are not exhibited in the presence of all surfactants. Specifically, the surfactant must be an ethoxylated type. Examples of such surfactants are ethoxylated rosin amine, ethoxylated sorbitan esters, ethoxylated alkyl sulfonates, ethoxylated fatty acids, fatty alcohols and alkyl substituted phenols.

Copolymers of this invention can be prepared by methods known and used to polymerize ethylene oxide. In a preferred method, the copolymerization is carried out in the presence of a catalyst formed by reacting a trialkylaluminum compound first with, per mole of aluminum, 0.5 to 10 moles of tetrahydrofuran, then with 0.5 to 1 mole of water, 0.3 to 1 mole of diketone and 0.05 to 0.4 mole of ether alcohol. Such catalysts are described in U.S. Pat. No. 3,642,667. The copolymerization is carried out in anhydrous conditions in an inert diluent at temperatures between about −30° and 150° C. The ethylene oxide and the $C_{12}-C_{25}$ epoxide are preferably added to the reaction vessel simultaneously, resulting in random copolymerization.

To characterize the copolymers of this invention, the comonomer content is determined by quantitative gas chromatography of degradation products from strong acid. The molecular weight is determined by intrinsic viscosity in chloroform at 30° C.

The invention is illustrated by the following examples. Parts and percentages are by weight unless otherwise indicated.

EXAMPLES 1-28

A catalyst solution was prepared by placing 400 ml. of 25% triethylaluminum solution in anhydrous toluene in a nitrogen purged reaction vessel, maintaining a nitrogen blanket in the reaction. The temperature was maintained at about 0° C. and 432 grams of the tetrahydrofuran was added with agitation. After ten minutes, 1.44 grams of oxygen-free water was added dropwise with agitation, followed by 40 grams of 2,4-pentanedione and 81.6 grams of tetrahydrofurfuryl alcohol. After another ten minutes agitation, the solution was allowed to come to room temperature. It was then aged for one hour at 95° C. For each of the reaction runs 1 through 28, 4 parts of this catalyst solution was used.

To an argon filled reactor bottle was charged 174.2 parts of anhydrous toluene. The specified amount of long chain alkylene epoxide was added, either in liquid form or dissolved in toluene if a solid. Condensed ethylene oxide—22 parts—was added to the reactor, followed by the catalyst solution. Reaction was allowed to continue for 3 to 4 hours at 40° C., at which time a small amount of tertiary butyl alcohol was added to stop polymerization. Unreacted ethylene oxide was vented, and the reaction solution was diluted with 174 parts of toluene, then precipitated with 1980 parts of hexane. The product is then washed several times with hexane and vacuum dried, yielding a powdery white product.

Two control runs, without long chain alkylene epoxide, were also carried out. Data concerning all of the products are recorded in Table 1.

TABLE 1

| No. | Co-monomer Type | Co-monomer Wt % Feed | Co-monomer Wt % Polymer | M.W. | Viscosity* | % Insoluble in H$_2$O | % Insoluble in 15% HCl |
|---|---|---|---|---|---|---|---|
| 1 | None | 0 | 0 | 600,000 | 16.5 | 5 | none |
| 2 | None | 0 | 0 | 300,000 | 8.5 | 4 | none |
| 3 | C$_{20-24}$ | 15.7 | 1.86 | 300,000 | — | 48 | none |
| 4 | " | 17 | 1.64 | 350,000 | 3,400 | trace | none |
| 5 | " | 8.3 | 0.58 | 450,000 | 2,300 | none | none |
| 6 | " | 6.4 | 0.47 | 375,000 | 500 | none | none |
| 7 | " | 4.3 | 0.28 | 400,000 | 125 | none | none |
| 8 | " | 2.2 | 0.09 | 500,000 | 30 | none | none |
| 9 | C$_{18}$ | 18.5 | 2.12 | 450,000 | 70 | 85 | 68 |
| 10 | " | 17.0 | 1.72 | 500,000 | 400 | 63 | none |
| 11 | " | 15.4 | 1.67 | 450,000 | 7,000 | 50 | none |
| 12 | " | 15.4 | 1.40 | 700,000 | 14,000 | 33 | none |
| 13 | " | 12.0 | 1.17 | 475,000 | 2,200 | trace | none |
| 14 | " | 8.3 | 0.84 | 500,000 | 210 | 11 | none |
| 15 | " | 4.3 | 0.33 | 500,000 | 60 | trace | none |
| 16 | " | 2.2 | 0.20 | 450,000 | 32 | trace | none |
| 17 | C$_{16}$ | 26.6 | 3.70 | 350,000 | 57 | 49 | none |
| 18 | " | 18.5 | 2.01 | 400,000 | 150 | 20 | none |
| 19 | " | 12.0 | 1.38 | 350,000 | 83 | 53 | none |
| 20 | " | 8.3 | 0.73 | 400,000 | 26 | trace | none |
| 21 | " | 4.3 | 0.37 | 400,000 | 16 | none | none |
| 22 | " | 2.2 | 0.21 | 475,000 | 17 | trace | none |
| 23 | C$_{14}$ | 26.6 | 3.76 | 300,000 | 55 | 17 | none |
| 24 | " | 21.4 | 2.95 | 350,000 | 75 | 23 | none |
| 25 | " | 18.5 | 2.87 | 450,000 | 100 | haze | none |
| 26 | " | 15.4 | 2.09 | 350,000 | 53 | haze | none |
| 27 | " | 8.3 | 0.96 | 500,000 | 29 | haze | none |
| 28 | " | 4.3 | 0.56 | 500,000 | 14 | haze | none |

*Viscosity of 1% aqueous solution measured with Brookfield Viscometer

EXAMPLES 29-38

One percent (1%) solutions of copolymers of ethylene and C$_{20}$ epoxide were treated with various surfactants as detailed in Table 2.

TABLE 2

| Ex. No. | Co-monomer Level | Surfactant | Surfactant Concentration (g/10,000) | Brookfield Viscosity (cp) No Surfactant | Brookfield Viscosity (cp) With Surfactant |
|---|---|---|---|---|---|
| 29 | 1.7 | Triton X-100 | .25 | 91 | 148,000 |
| 30 | 1.33 | " | .19 | 230 | 192,000 |
| 31 | 0.89 | " | .07 | 2700 | 31,000 |
| 32 | 1.7 | " | .21 | 91 | 700 |
| 33 | 1.33 | " | .11 | 230 | 10,800 |
| 34 | 1.7 | Span 20 | .25 | 91 | 91 |
| 35 | 1.7 | Tergitol Anionic 4 | .25 | 90 | 110, clarified |
| 36 | 1.7 | Myrj 52 | .20 | 91 | 200, (at 10 min.) |
| 37 | 1.7 | Myrj 52 | .20 | 91 | Gel (overnight) |
| 38 | 1.7 | Alfonic-1412-60 | .20 | 91 | Gel |

Notes:
(1) Span 20 is sorbitan monolaurate.
(2) Tergitol Anionic 4 is sodium lauryl sulfate.
(3) Myrj 52 is stearate polyoxyethylene (40).
(4) Alfonic-1412-60 is polyethoxylated coconut oil, 60% by wt. of EO.
(5) Triton X-100 is ethoxylated octyl phenol with about 10 moles of ethylene oxide.

As the data show, viscosity of the 1% solution was increased only by the polyethoxylated surfactants. None of the surfactants caused a noticeable change in the viscosity of a poly(ethylene oxide) homopolymer solution.

EXAMPLE 39

The copolymer of ethylene oxide with a 1.86% C$_{20}$-C$_{24}$ epoxide as described in Example 4 was dissolved in 15% HCl. The Brookfield viscosity was 21.5 cps., at 1% polymer level. A rosin amide ethylene oxide adduct, having on the average 5 moles of ethylene oxide per mole of amine was added to the solution at a level of 0.2%. The viscosity increased to 205 cps. A homopolymer of ethylene oxide of comparable molecular weight had a viscosity at 1% polymer in 15% HCl, with and without the ethoxylated rosin amine, of 11.5 cps.

A copolymer with 1.4% C$_{18}$ epoxide comonomer had a 1% viscosity in 15% HCl of 47 cps. With 0.16% of the ethoxylated rosin amine, the viscosity increased to 500 cps. Ninety percent of this final viscosity was retained after heating the solution for 4 hours at 65° C.

The copolymers of this invention are useful as thickeners in a variety of applications where water-soluble polymers have been employed heretofore for viscosity increasing purposes, such as, in particular, in shampoos and cosmetics. Their greater viscosifying power makes them advantageous as they can be used at substantially lower concentrations.

The stability and thickening power of these copolymers in strong acid makes them useful in the petroleum industry in stimulating petroleum production via acid fracturing. In this application a polymer is required which has a relatively high viscosity which can be maintained for at least four hours at a temperature of 68° C. (150° F.) or higher, and which, when it degrades, forms low viscosity, liquid degradation products. The copolymers of this invention meet these requirements. Additionally, the ethoxylated rosin amines, which are widely used with acid fracturing solutions as anti-corrosion agents, are surfactants of the type which increase the viscosity and solubility of the copolymers as explained hereinbefore and demonstrated in Example 39.

What I claim and desire to protect by Letters Patent is:

1. A copolymer containing about 96 to 99.9% by weight of ethylene oxide and about 4 to 0.1% by weight of at least one 1,2-epoxy-n-alkane having about 12 to 25 carbon atoms, said copolymer having a molecular weight of from about 25,000 to about 4,000,000.

2. A copolymer according to claim 1 wherein the 1,2-epoxy-n-alkane has 18 to 24 carbon atoms and is present in the amount of about 2 to 0.4%.

* * * * *